(12) United States Patent
Tominaga et al.

(10) Patent No.: US 6,888,582 B2
(45) Date of Patent: May 3, 2005

(54) OPTICAL DISPLAY SYSTEM

(75) Inventors: Kanehiro Tominaga, Tenri (JP); Takashi Shibatani, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 103 days.

(21) Appl. No.: 10/411,201

(22) Filed: Apr. 11, 2003

(65) Prior Publication Data

US 2003/0193642 A1 Oct. 16, 2003

(30) Foreign Application Priority Data

Apr. 12, 2002 (JP) ........................................ 2002-111012

(51) Int. Cl.[7] ........................... G02F 1/1333; G02F 1/13
(52) U.S. Cl. ........................... 349/5; 349/196; 349/161
(58) Field of Search ........................... 349/5, 196, 161, 349/162

(56) References Cited

U.S. PATENT DOCUMENTS

| 4,773,735 | A | * | 9/1988 | Ukrainsky et al. | .......... 349/161 |
| 5,757,443 | A | * | 5/1998 | Kobayashi | .................... 349/5 |
| 6,061,103 | A | * | 5/2000 | Okamura et al. | ........... 348/767 |
| 6,108,067 | A | * | 8/2000 | Okamoto | .................... 349/152 |

FOREIGN PATENT DOCUMENTS

| JP | 8-194207 A | 7/1996 |
| JP | 11326877 A | 11/1999 |
| JP | 11-326877 | * 11/1999 |

OTHER PUBLICATIONS

Yasuda et al., Asia Display (1995) Japan, pp. 79–82.

* cited by examiner

*Primary Examiner*—Tarifur R. Chowdhury
*Assistant Examiner*—Mike Qi
(74) *Attorney, Agent, or Firm*—Birch, Stewart, Kolasch, & Birch, LLP.

(57) ABSTRACT

An optical shifter includes at least one liquid crystal cell and a birefringent element. The liquid crystal cell has a first surface to receive light thereon and a second surface to pass the light therethrough and selectively changes polarization states of the light according to a voltage applied thereto. The birefringent element receives the light that has gone out of the liquid crystal cell through the second surface thereof, and selectively shifts the optical path of the light depending on the polarization state of the light. The optical shifter controls the temperature of the liquid crystal cell by way of at least one heat transfer member, through which heat can be transferred to/from the first surface and/or the second surface of the liquid crystal cell.

23 Claims, 6 Drawing Sheets

OPTICAL DISPLAY SYSTEM

BACKGROUND OF THE INVENTION

1. Field of the Invention

The present invention relates to an optical shifter for use to present a high-resolution image on a projection plane by optically displacing the locations of pixels on the projection plane by a wobbling technique, and also relates to an optical display system including such an optical shifter.

2. Description of the Related Art

A technique of increasing the resolution of an image to be presented by a display panel on a projection plane by optically displacing the locations of pixels on the projection plane (such a technique will be referred to herein as an "image wobbling (or shifting) technique") is disclosed in Asia Display '95 Digest, pp. 79–82. According to this technique, the apparent locations of pixels being displayed on a projection plane are periodically displaced time-sequentially, thereby increasing the apparent number of pixels. As used herein, the "image" broadly refers to any two-dimensional arrangement of information. Thus, the "images" to be presented on the projection plane include not just images in a narrow sense but also various other types of information such as texts and characters.

A technique of sequentially superimposing three image components, represented by three groups of pixels in the three primary colors of red, green and blue in a display panel, on a projection plane is disclosed in Japanese Laid-Open Publication No. 8-194207, for example. If these three groups of pixels are not wobbled periodically, then each of those pixels will just display red, green or blue. However, this technique realizes a full-color display time-sequentially at each pixel location, thus increasing the resolution of the resultant image displayed.

Figure 9:
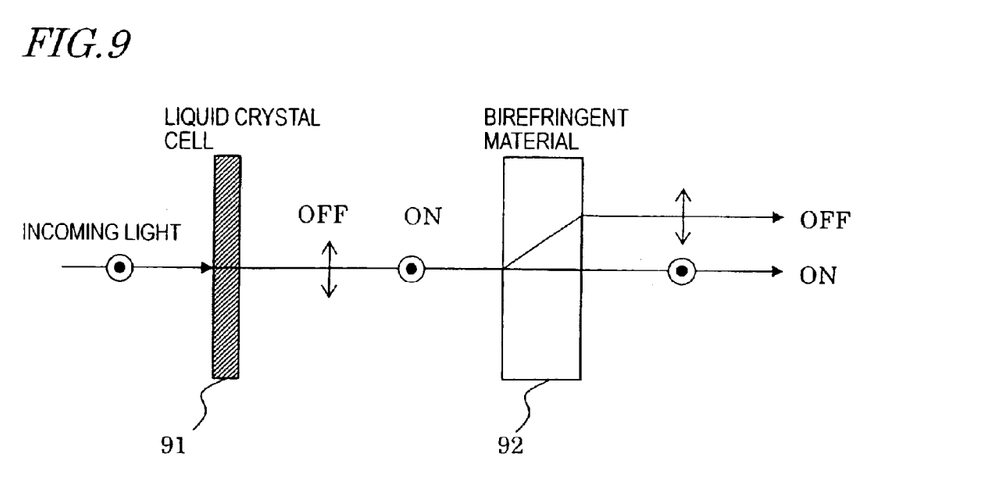
FIG. 9 is a cross-sectional view schematically illustrating a conventional optical shifter that includes a liquid crystal cell and a birefringent element.

FIG. 9 shows a conventional optical shifter for use to achieve such image wobbling. As shown in FIG. 9, the optical shifter includes a liquid crystal cell 91 and a birefringent element 92. The liquid crystal cell 91 is disposed at such a position as receiving the incoming light (which position will be referred to herein as "on the light incoming side"), while the birefringent element 92 is disposed at such a position as sending the light out (which position will be referred to herein as "on the light outgoing side). The liquid crystal cell 91 includes a first surface on which the incoming light is incident (which surface will be referred to herein as a "light incoming surface") and a second surface through which the light leaves the liquid crystal cell (which surface will be referred to herein as a "light outgoing surface"). The liquid crystal cell 91 can change the polarization states of the incoming light according to the voltage applied thereto. More specifically, the liquid crystal cell 91 switches from the state of transmitting the incoming light as it is without rotating the polarization axis thereof at all into the state of rotating the polarization direction thereof by approximately 90 degrees, or vice versa. As used herein, the "polarization direction" means a direction that is perpendicular to the direction in which the light is propagated and that is parallel to the vibration plane of the electric vector.

This switching operation of the liquid crystal cell 91 is controlled by the level of the voltage to be applied to the liquid crystal layer of the liquid crystal cell 91. Suppose a polarized light ray having a polarization direction that comes out of the paper is incident onto the first surface of the liquid crystal cell 91 as shown in FIG. 9. In the example shown in FIG. 9, if the voltage being applied to the liquid crystal cell 91 is in OFF state (i.e., when zero voltage is being applied to the liquid crystal layer), then a polarized light ray, of which the polarization axis has been rotated approximately 90 degrees, goes out through the second surface of the liquid crystal cell 91. In that case, the light ray that has gone out through the second surface has a polarization axis that is parallel to the paper as shown in FIG. 9. On the other hand, if the voltage being applied to the liquid crystal cell 91 is in ON state (e.g., when a voltage of 5 V is being applied to the liquid crystal layer), then a polarized light ray, of which the polarization axis has not been rotated at all, goes out through the second surface of the liquid crystal cell 91. In that case, the light ray that has gone out through the second surface has a polarization axis that is still perpendicular to the paper as shown in FIG. 9. The liquid crystal layer of the liquid crystal cell 91 may operate in any of various known liquid crystal display modes including the twisted nematic (TN) mode, optically compensated birefringence (OCB) mode and ferroelectric liquid crystal (FLC) mode.

The birefringent element 92 selectively shifts the optical axis of an incoming linearly polarized light ray depending on the polarization direction thereof. For that purpose, the birefringent element 92 is made of a uniaxial crystalline material exhibiting birefringence and having a thickness t.

In the example shown in FIG. 9, while the voltage being applied to the liquid crystal cell 91 is in OFF state, the light ray that has passed through the birefringent element 92 is shifted as an extraordinary ray. On the other hand, while the voltage being applied to the liquid crystal cell 91 is in ON state, the light ray that has passed through the birefringent element 92 is not shifted at all because that light ray is an ordinary ray. The magnitude of this shifting can be regulated by the thickness t of the birefringent element 92.

Examples of preferred materials for the birefringent element 92 include quartz, lithium niobate, calcite, mica, rutile ($TiO_2$) and nitratine ($NaNO_3$). If the total weight of the display system should be reduced as in a head mounted display (HMD), lithium niobate or rutile having relatively large refractive index anisotropy $\Delta n$ is preferably used. When the birefringent element 92 is made of such a high $\Delta n$ material, the minimum required image shift is realized by the birefringent element 92 with a reduced thickness. Thus, such a material can be used effectively to reduce the overall size or weight of the display system.

One of the problems that optical display systems of this type (i.e., attempting to increase the resolution by utilizing the wobbling technique) commonly have is that the resultant image quality heavily depends on the response characteristic of the liquid crystal cell 91 included in the optical shifter. The response characteristic of the liquid crystal cell 91 in turn exhibits temperature dependence. For these reasons, to achieve good response characteristics, the temperature of the liquid crystal cell 91 needs to be maintained within an appropriate range.

A conventional technique of controlling the temperature of the liquid crystal cell is described in Japanese Laid-Open Publication No. 11-326877, for example. According to that technique, the liquid crystal cell is directly surrounded with, and heated by, a heater. The conventional heating technique will be described with reference to FIG. 10.

Figure 10:
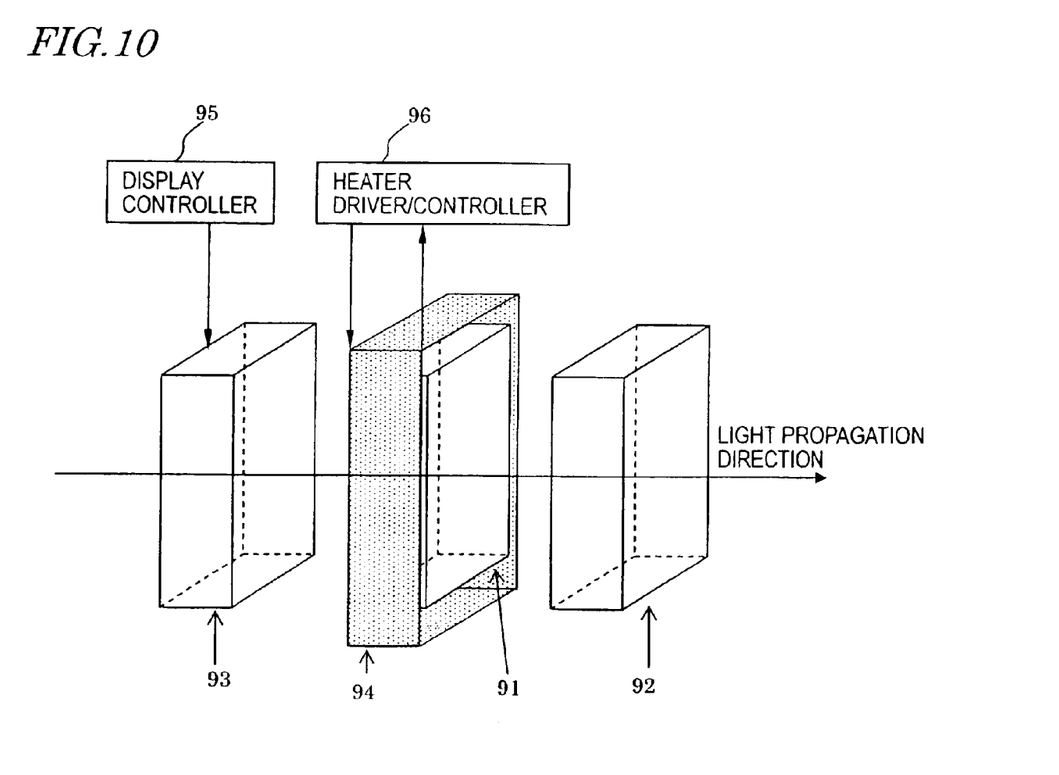
FIG. 10 illustrates a conventional optical display system that includes a mechanism for heating the optical shifter.

As shown in FIG. 10, the conventional optical display system includes: a display panel 93; a liquid crystal cell 91 that selectively changes the polarization states of the outgoing light of the display panel 93 according to the voltage applied to the cell 91; and a birefringent element 92 for selectively shifting the optical path of the light that has gone out of the liquid crystal cell 91 depending on the polarization state thereof. The display operation of the display panel 93 is controlled by a display controller 95.

In the example shown in FIG. 10, a heater 94 is provided around the side surfaces of the liquid crystal cell 91 to maintain the temperature of the liquid crystal cell 91 within a predetermined range and thereby keep the response characteristic of the liquid crystal cell 91 good enough. A temperature sensor (not shown) is provided near the heater 94. In accordance with the output of the temperature sensor, a heater driver/controller 96 controls the ON/OFF states of the heater 94 (i.e., selectively energizes the heater 94).

However, if the liquid crystal cell 91 is heated inward (i.e., from around the liquid crystal cell 91) by the heater 94 that surrounds the liquid crystal cell 91, then the two-dimensional temperature distribution of the liquid crystal cell 91 might become non-uniform depending on the size of the light incoming and outgoing surfaces (i.e., the two surfaces of the liquid crystal cell 91 through which the incoming light passes). More specifically, when the liquid crystal cell 91 is heated by the surrounding heater 94, the temperature rises more easily at the peripheral portions of the liquid crystal cell 91 than at the center portion thereof. As a result, the response speed of liquid crystal molecules will have a non-uniform two-dimensional distribution in the liquid crystal cell 91. Then, the resultant image quality will deteriorate significantly.

The conventional optical display system shown in FIG. 10 also has another problem. Specifically, in this display system, the liquid crystal cell 91 itself is approximately as thin as two glass plates. Thus, it is actually difficult to equip that thin liquid crystal cell 91 with the heater 94.

Japanese Laid-Open Publication No. 11-326877 identified above also discloses a technique of heating the overall liquid crystal cell uniformly by providing a heater pattern (made of a transparent conductive film) on the glass substrate of the cell.

In this method, the liquid crystal cell can have a substantially uniform two-dimensional temperature distribution, thus causing almost no variation in response speed. However, since the transparent conductive film is inserted into the optical path, the transmittance of the light should decrease.

Figure 11:
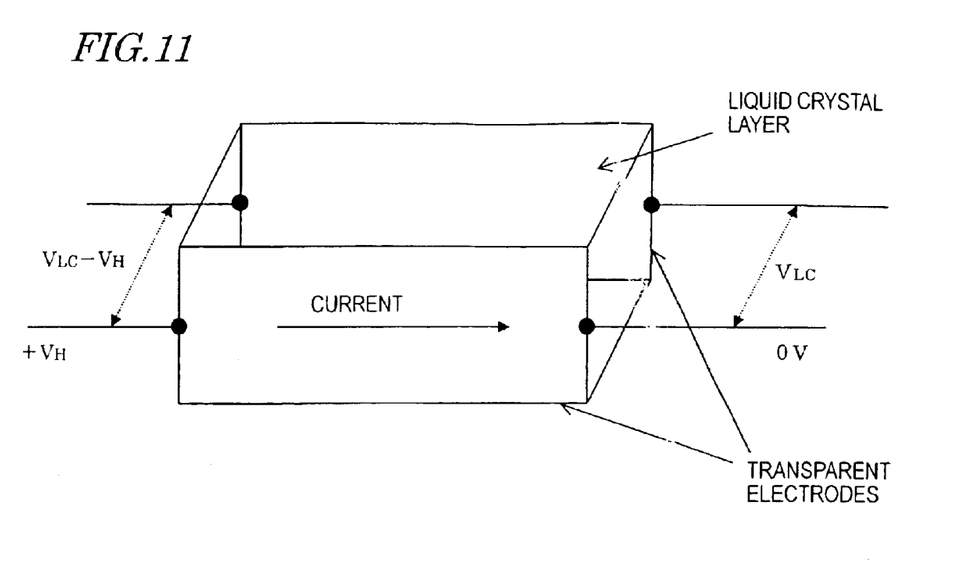
FIG. 11 shows what problems arise when one of two transparent electrodes for driving a liquid crystal layer is used as a heater.

FIG. 11 shows an alternative technique of using one of two transparent electrodes, which should be provided for the liquid crystal cell to drive the liquid crystal layer, as a heater by creating a voltage $V_H$ between two terminals of the transparent electrode such that a current flows through a plane of that transparent electrode. In this method, the transparent conductive film that is indispensable to operate the liquid crystal cell can be used effectively as a heater. That is to say, since no additional transparent conductive film pattern is provided, the transmittance of the light does not decrease. In this configuration, however, not only the voltage $V_H$ needs to be created between the two terminals of the transparent electrode to generate the heat, but also another voltage $V_{LC}$ needs to be created between the pair of transparent electrodes to drive the liquid crystal layer. Thus, a gradient will be produced in the voltage that is actually applied to the liquid crystal layer. As a result, the response characteristic of liquid crystal molecules might have a non-uniform two-dimensional distribution.

It should be noted that if multiple pairs of liquid crystal cells and birefringent elements are used in combination, then the image can be selectively shifted to one of three or more locations on a projection plane. In that case, however, it is necessary to equalize the response speeds of the respective liquid crystal cells with each other as opposed to the situation where just one liquid crystal cell is used. This is because if the respective liquid crystal cells have mutually different response speeds, then the image shifting timing will become inconsistent and the resultant image quality will deteriorate. For that reason, the temperatures of all liquid crystal cells must be kept uniform in that case. However, Japanese Laid-Open Publication No. 11-326877 identified above provides no solutions for this problem.

SUMMARY OF THE INVENTION

In order to overcome the problems described above, preferred embodiments of the present invention provide an optical shifter that can make the two-dimensional distribution of the response characteristic of the liquid crystal cell uniform enough to minimize the deterioration in image quality due to the two-dimensional variation of the response characteristic, and also provide an optical display system including such an optical shifter.

An optical shifter according to a preferred embodiment of the present invention preferably includes at least one liquid crystal cell and a birefringent element. The liquid crystal cell preferably has a first surface to receive light thereon and a second surface to pass the light therethrough and preferably selectively changes polarization states of the light according to a voltage applied thereto. The birefringent element preferably receives the light that has gone out of the liquid crystal cell through the second surface thereof and preferably selectively shifts the optical path of the light depending on the polarization state of the light. The optical shifter preferably controls the temperature of the liquid crystal cell by way of at least one heat transfer member, through which heat is transferable to/from the first surface and/or the second surface of the liquid crystal cell.

In one preferred embodiment of the present invention, the birefringent element preferably also functions as the heat transfer member.

In this particular preferred embodiment, the birefringent element is preferably in contact with the second surface of the liquid crystal cell either directly or by way of a layer of a material that has a higher thermal conductivity than the air.

In an alternative preferred embodiment, the heat transfer member may include a transparent block that is disposed beside the first surface of the liquid crystal cell.

In that case, the transparent block is preferably in contact with the first surface of the liquid crystal cell either directly or by way of a layer of a material that has a higher thermal conductivity than the air.

In another preferred embodiment, the optical shifter may further include a heater for heating at least a portion of the heat transfer member.

In this particular preferred embodiment, the heater is preferably in contact with a side surface of the heat transfer member either directly or by way of a layer of a material that has a higher thermal conductivity than the air.

Specifically, the heater is preferably in contact with only the side surface of the heat transfer member.

In yet another preferred embodiment, the quantity of heat to be generated by the heater is preferably adjusted according to an average level of an image signal representing an image to be shifted.

An optical shifter according to another preferred embodiment of the present invention preferably includes a plurality of liquid crystal cells, a first birefringent element and a second birefringent element. The liquid crystal cells include at least a first liquid crystal cell and a second liquid crystal cell. Each of the first and second liquid crystal cells preferably has a first surface to receive light thereon and a second surface to pass the light therethrough and preferably selectively changes polarization states of the light according to a voltage applied thereto. The first birefringent element preferably receives the light that has gone out of the first liquid crystal cell through the second surface thereof and preferably selectively shifts the optical path of the light depending on the polarization state of the light. The second birefringent element preferably receives the light that has gone out of the second liquid crystal cell through the second surface thereof and preferably selectively shifts the optical path of the light depending on the polarization state of the light. The optical shifter preferably controls the temperatures of the first and second liquid crystal cells by way of at least one heat transfer member, through which heat is transferable to/from the second surface of the first liquid crystal cell and the first surface of the second liquid crystal cell.

In one preferred embodiment of the present invention, the first birefringent element preferably also functions as the heat transfer member.

In an alternative preferred embodiment, the heat transfer member may include at least one transparent block that is provided between the first birefringent element and the first and/or second liquid crystal cell(s).

In this particular preferred embodiment, the heat transfer member preferably includes: a first transparent block that is provided between the first liquid crystal cell and the first birefringent element; a second transparent block that is provided between the second liquid crystal cell and the first birefringent element; and the first birefringent element.

In a specific preferred embodiment, the first and second transparent blocks are preferably each in contact with the first birefringent element either directly or by way of a layer of a material that has a higher thermal conductivity than the air.

In another preferred embodiment, the optical shifter may further include a heater for heating at least a portion of the heat transfer member.

In that case, the heater may be in contact with a side surface of the heat transfer member either directly or by way of a layer of a material that has a higher thermal conductivity than the air.

Alternatively, the heater may be in contact with a side surface of the first birefringent element either directly or by way of a layer of a material that has a higher thermal conductivity than the air.

As another alternative, the heater may be in contact with side surfaces of the first and second transparent blocks either directly or by way of a layer of a material that has a higher thermal conductivity than the air.

In another preferred embodiment, the quantity of heat to be generated by the heater is preferably adjusted according to an average level of an image signal representing an image to be shifted.

In still another preferred embodiment, the thermal conductivity of the transparent block(s) is preferably higher than that of the liquid crystal cell(s).

In yet another preferred embodiment, the heat transfer member may have the function of supporting the birefringent element and/or the transparent block(s).

An optical display system according to a preferred embodiment of the present invention preferably includes the optical shifter according to any of the preferred embodiments of the present invention described above.

Another optical display system according to another preferred embodiment of the present invention preferably includes: a display panel having a display plane on which multiple pixels are arranged in a regular pattern; a display controller for supplying an image signal, representing an image to be presented on the display plane, to the display panel; and the optical shifter according to any of the preferred embodiments of the present invention described above. Synchronously with switching of the images presented on the display plane, the optical shifter periodically shifts the optical axis of a light ray, which has gone out of the display plane, perpendicularly to the optical axis.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Embodiment 1

Hereinafter, an optical display system according to a first specific preferred embodiment of the present invention will be described with reference to FIGS. 1, 2 and 3.

Figure 1:
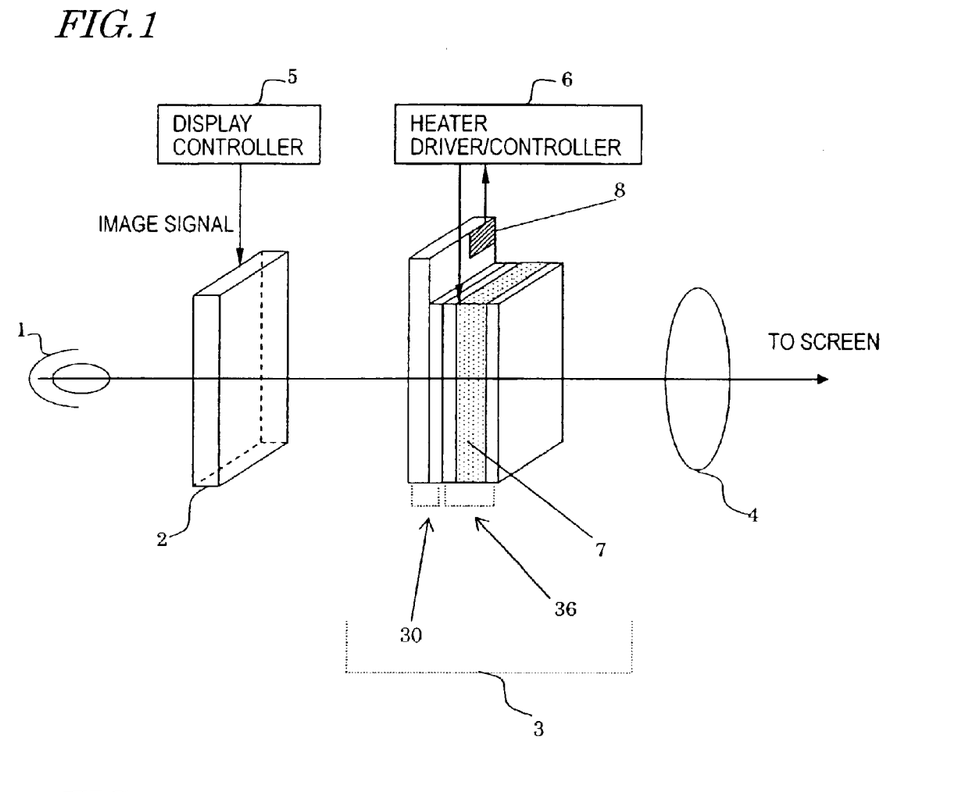
FIG. 1 illustrates an optical display system according to a first specific preferred embodiment of the present invention.

As shown in FIG. 1, the optical display system of this preferred embodiment is a projection type display system that includes a light source 1, a display panel 2, an optical shifter 3 and a projection lens 4. The display panel 2 is a transmission type display including color filters (not shown). The light that has been emitted from the light source 1 is illuminated onto the display panel 2, thereby forming an image on the display panel 2. The image produced is passed through the optical shifter 3 and then magnified and projected by the projection lens 4 onto a screen (or projection plane (not shown)).

The display panel 2 has a display plane on which multiple pixels are arranged in a regular pattern. In response to an image signal supplied from a display controller 5, the display panel 2 forms an image on the display plane. The image signal represents the image to be presented on the screen. The configuration of the display panel 2 is not particularly limited. Thus, a transmission type liquid crystal display panel having a known configuration may be used.

Synchronously with the switching of image frames or sub-frames to be displayed on the display panel 2, the optical shifter 3 periodically shifts the optical axis of the outgoing light of the display panel perpendicularly to the optical axis. As a result, the apparent number of pixels of the image being presented on the screen doubles compared to the real number of pixels of the display panel 2.

In this preferred embodiment, the optical shifter 3 includes a liquid crystal cell 30 provided on the light incoming side and a birefringent element 36 provided on the light outgoing side. The liquid crystal cell 30 and the birefringent element 36 are joined together with any thermosetting transparent silicon resin on the market. A layer of that resin to be interposed between the liquid crystal cell 30 and the birefringent element 36 may have a thickness of several $\mu$m.

The liquid crystal cell 30 includes a pair of substrates and a liquid crystal layer that is sandwiched between the substrates. In the example shown in FIG. 1, one of the two substrates of the liquid crystal cell 30 has a planar size (i.e., an area) that is approximately equal to that of the birefringent element 36, while the other substrate of the liquid crystal cell 30 is bigger than the former substrate or the birefringent element 36. These two substrates of the liquid crystal cell 30 may be made of borosilicate glass having a thermal conductivity of about 0.76 W/m·K.

The liquid crystal cell 30 has a first surface to receive light thereon and a second surface to pass the light therethrough, and can selectively change the polarization states of the light according to the voltage being applied to the liquid crystal layer thereof. In this preferred embodiment, the liquid crystal cell 30 switches from the state of transmitting an incoming light ray (which is a substantially linearly polarized light ray in the visible range) as it is without rotating the polarization axis thereof at all into the state of rotating the polarization direction thereof approximately 90 degrees, or vice versa. This switching operation is controlled by an optical shifter driver (not shown). More specifically, synchronously with the switching of frames or sub-frames of the image signal being supplied to the display panel 2, the driver periodically changes the voltages to be applied to the liquid crystal layer of the liquid crystal cell 30.

The birefringent element 36 can shift the optical axis of the incoming linearly polarized light ray depending on the polarization direction thereof. The birefringent element 36 may be made of a uniaxial crystalline material with optical anisotropy and may have a thickness of about 5 mm to about 7 mm.

A specific operation of this optical shifter 3 is similar to that of the conventional optical shifter that has already been described with reference to FIG. 9. This optical shifter 3 can selectively shift the image to one of two different locations on the projection plane, thus virtually doubling the number of display pixels.

Figure 2:
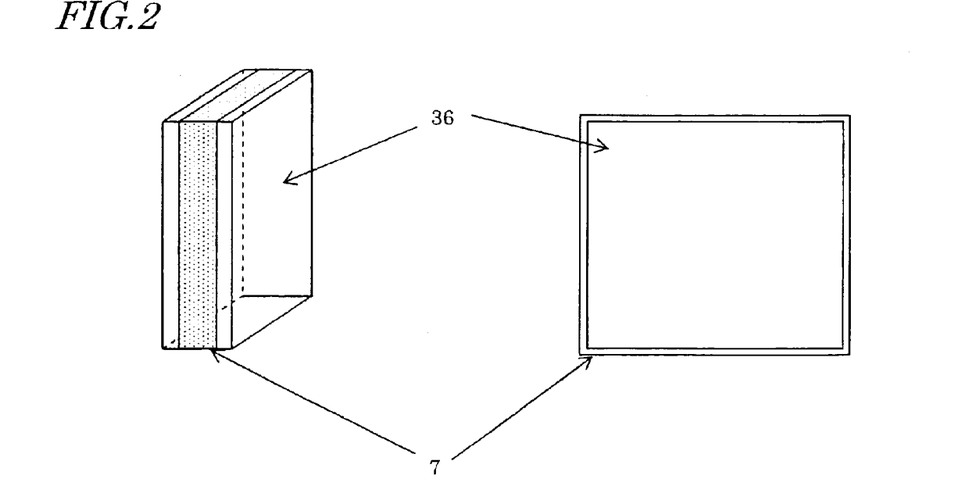
FIG. 2 separately illustrates the optical shifter with the heater for use in the first preferred embodiment.

FIG. 2 separately illustrates the birefringent element 36 of the optical shifter 3 shown in FIG. 1. A sheetlike electro-thermal heater 7 is wound around the birefringent element 36 to heat the side surfaces of the birefringent element 36. As shown in FIG. 1, the heater 7 is connected to a heater driver/controller 6 such that the quantity of heat generated by the heater 7 is controlled by the heater driver/controller 6.

As described above, the birefringent element 36 of this preferred embodiment functions not just as an optical member but also as a heat transfer member that controls the temperature of the liquid crystal cell 30. For that reason, the birefringent element 36 is preferably made of a material having a high thermal conductivity.

In this preferred embodiment, the birefringent element 36 is preferably made of quartz or sapphire, for example. Quartz has a thermal conductivity of about 5.4 W/m·K to about 9.3 W/m·K, which is much higher than the thermal conductivity (of about 0.8 W/m·K) of the liquid crystal panel 2 (or substrates). In quartz, heat is not conducted so easily in a direction that is parallel to the crystal axes thereof but is conducted easily in a direction that is perpendicular to the crystal axes. That is to say, quartz exhibits the lowest thermal conductivity of about 5.4 W/m·K parallelly to the crystal axes and the highest thermal conductivity of about 9.3 W/m·K perpendicularly to the crystal axes. On the other hand, sapphire has a thermal conductivity of about 42.0 W/m·K.

In this preferred embodiment, the heater 7 for use to heat the birefringent element 36 is made of a stainless steel thin film, and may have a width of about 4 mm to about 6 mm, which is smaller than the thickness of the birefringent element 36. When current flows through the heater 7, the heater 7 generates Joule heat, thereby heating the side surfaces of the birefringent element 36. The heat is then transferred to the liquid crystal cell 30, thereby heating the liquid crystal cell 30 indirectly.

The liquid crystal cell 30 and the birefringent element 36 are joined together in this preferred embodiment with the resin described above such that the heat transfer can be carried out smoothly between the light outgoing surface (i.e., the second surface) of the liquid crystal cell 30 and the birefringent element 36. Where the liquid crystal cell 30 and the birefringent element 36 are joined together with a resin in this manner, however, the resin needs to maintain a predetermined degree of flexibility even after cured to prevent the liquid crystal cell 30 and the birefringent element 36 from peeling off each other due to a difference in thermal expansion coefficient between them.

In this preferred embodiment, a temperature sensor 8 for sensing the temperature of the liquid crystal cell 30 is provided on the liquid crystal cell 30 as shown in FIG. 1. In accordance with the output of the temperature sensor 8, the heater driver/controller 6 controls the power to be supplied to the heater 7 (i.e., the amount of current supplied thereto and/or the ON/OFF states of the current). As a result, the temperature of the liquid crystal cell 30 can be maintained within a preferred range (e.g., around 60° C.) in which the liquid crystal cell 30 can exhibit a good response characteristic.

In this preferred embodiment, the principal surface of the liquid crystal cell 30 is heated indirectly by way of the birefringent element 36 that has a higher thermal conductivity than the substrate of the liquid crystal cell 30. Thus, compared to the situation where the liquid crystal cell 91 is heated directly by the sheetlike heater 94 that surrounds the side surfaces of the liquid crystal cell 91 (see FIG. 10), the two-dimensional temperature distribution of the liquid crystal cell 30 can be uniformized more easily. Consequently, the response speed of liquid crystal molecules can have a highly uniform two-dimensional distribution and the resultant image quality improves.

Also, no additional transparent electrode patterns are arranged on the optical path, and therefore, the transmittance of the optical shifter never decreases. In addition, the area of contact between the heater 7 and the object to be heated (i.e., the birefringent element 36) can be increased easily. As a result, the heat can be conducted much more efficiently.

Examples of other preferred materials for the birefringent element 36 include anisotropic crystals of calcite, rutile and nitratine.

It should be noted that the magnitude of optical shifting is regulated by the thickness t of the birefringent element 36. For that reason, if the magnitude of optical shifting should be small, then the birefringent element 36 might be too thin to be wrapped in the heater 7. In that case, a transparent block 40, having approximately the same planar size (or area) as the birefringent element 36 and a sufficient thickness t (e.g., t≧6 mm), may be provided beside the first surface of the liquid crystal cell 30 as shown in FIG. 3. The heater 7 may be provided around the transparent block 40.

Figure 3:
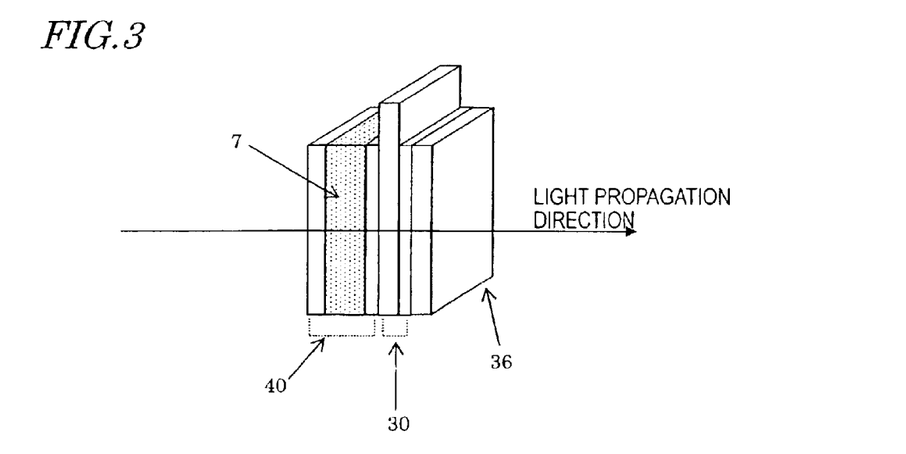
FIG. 3 illustrates another optical shifter that can be used effectively in the first preferred embodiment.

In the example shown in FIG. 3, the transparent block 40 that is thicker than the birefringent element 36 is provided on the light incoming side of the optical shifter but no heater is provided on the side surfaces of the birefringent element 36. However, even when the birefringent element 36 is sufficiently thick, the transparent block 40 may also be provided on the light incoming side of the optical shifter and the birefringent element 36 and the transparent block 40 may be each wrapped in the sheetlike heater 7 such that the liquid crystal cell 30 can be heated from both sides.

Alternatively, the transparent block 40 with the heater 7 may be disposed between the liquid crystal cell 30 and the birefringent element 36. In that case, if the planar size (i.e., the area) of the transparent block 40 is equalized with that of the birefringent element 36, then the transparent block 40 and the birefringent element 36 may be wrapped in the same heater. On the other hand, if the transparent block 40 is sufficiently thick, only the side surfaces of the transparent block 40 may be covered with the heater 7.

As another alternative, if the birefringent element 36 is sufficiently thin, the liquid crystal cell 30, birefringent element 36 and transparent block 40 may be arranged in this order and joined together with the resin. In that case, the heat that has been generated from the heater 7 is transferred to the second surface of the liquid crystal cell 30 by way of the transparent block 40 and the birefringent element 36. In this arrangement, the birefringent element 36 is interposed between the transparent block 40 being directly heated by the heater 7 and the liquid crystal cell 30. Thus, the birefringent element 36 preferably has a sufficiently high thermal conductivity.

In each of these various arrangements, the liquid crystal cell 30 is heated indirectly by way of the birefringent element 36 and/or the transparent block 40, and the birefringent element 36 and the transparent block 40 function as heat transfer members. The heat is conducted through these heat transfer members to/from the light incoming surface and/or light outgoing surface of the liquid crystal cell 30. Thus, the two-dimensional temperature distribution of the liquid crystal cell 30 can be uniformized easily.

To control the temperature of the liquid crystal cell 30 efficiently with such a heat transfer member, the principal surface of the heat transfer member preferably makes a close contact with the first surface or the second surface of the liquid crystal cell 30. If an air layer were present between the liquid crystal cell 30 and the heat transfer member, then the heat could not be transferred so smoothly. For that reason, the liquid crystal cell 30 and the heat transfer member are preferably joined together with a transparent material having a high thermal conductivity. In that case, a transparent UV-curing resin may be used instead of the thermosetting transparent silicon resin mentioned above.

When such a transparent block is provided, the transparent block is preferably made of a material having as high a thermal conductivity as possible. For example, the transparent block may be made of quartz or sapphire, which has a higher thermal conductivity than glass. However, these materials exhibit optical anisotropy. Accordingly, unwanted optical path shifting needs to be substantially eliminated from inside of the transparent block by adjusting the orientation directions of the crystal axes of that material. Speaking more strictly, the magnitude or the direction of optical path shifting to be caused by the transparent block should not be changed by the rotation of the polarization axis.

It should be noted that even when such a transparent block is inserted into the optical path, the transmittance decreases much less significantly than the situation where a resistive interconnection pattern of a transparent conductor is inserted into the optical path. Thus, the deterioration in image quality is avoidable.

In FIGS. 1, 2 and 3, the heater 7 is illustrated as making a full contact with the side surfaces of the birefringent element 36 or transparent block 40 functioning as a heat transfer member. However, the heater 7 does not have to contact with the four side surfaces of the heat transfer member entirely. For example, if a member (not shown) for fixing the birefringent element 36 to the optical display system is attached to one side or a portion of the birefringent element 36, then that side or portion does not have to contact with the heater 7. In any case, to uniformize the two-dimensional temperature distribution of the liquid crystal cell 30 sufficiently, the heater 7 preferably contacts with the heat transfer member over at least half of the side surface regions of the heat transfer member.

Embodiment 2

Hereinafter, an optical display system according to a second specific preferred embodiment of the present invention will be described with reference to FIGS. 4 through 6.

Unlike the projection type optical display system of the first preferred embodiment described above, the optical display system of this second preferred embodiment includes an optical shifter 43 made up of two pairs of liquid crystal cells and birefringent elements. Except for the optical shifter 43, the display system of the second preferred embodiment has substantially the same configuration as the counterpart of the first preferred embodiment described above.

Figure 4:
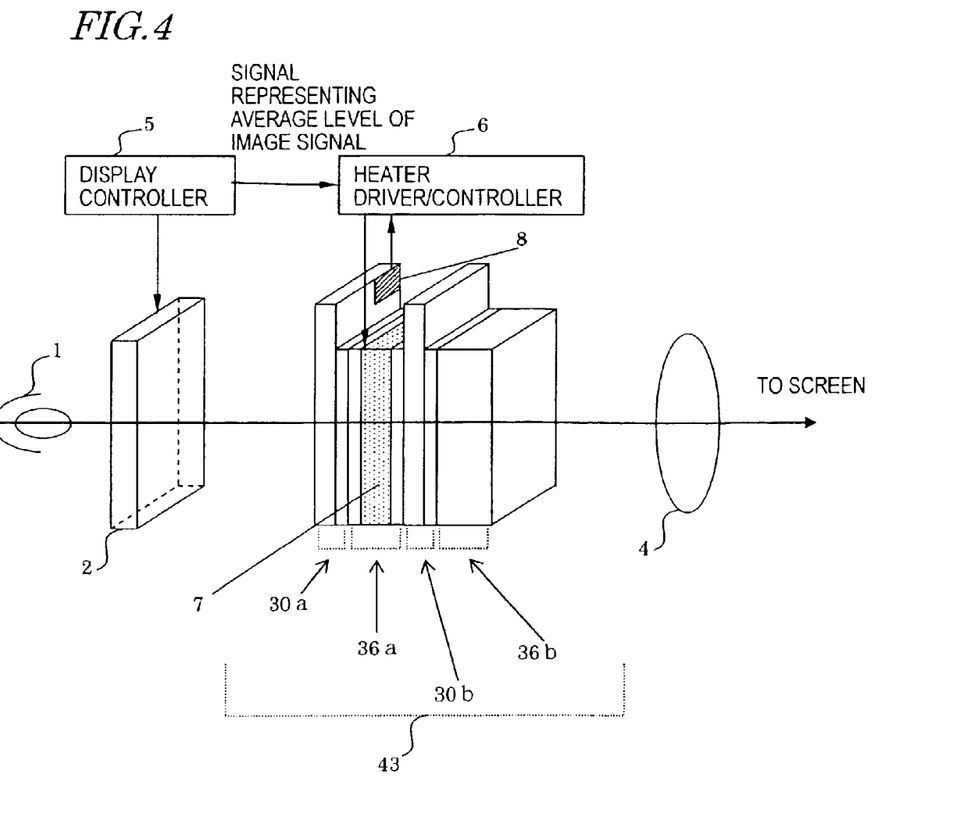
FIG. 4 illustrates an optical display system according to a second specific preferred embodiment of the present invention.

As shown in FIG. 4, the optical display system of this preferred embodiment includes the light source 1, display panel 2, optical shifter 43 and projection lens 4. The display panel 2 is a transmission type display including color filters (not shown). The light that has been emitted from the light source 1 is illuminated onto the display panel 2, thereby forming an image on the display plane of the display panel 2. The image produced is passed through the optical shifter 43 and then magnified and projected by the projection lens 4 onto a screen (or projection plane (not shown)).

The optical shifter 43 of this preferred embodiment includes a first liquid crystal cell 30*a*, a first birefringent element 36*a*, a second liquid crystal cell 30*b* and a second birefringent element 36*b*, which are arranged in this order such that the incoming light reaches the first liquid crystal cell 30*a* earlier than any other member of this optical shifter 43. These liquid crystal cells 30*a* and 30*b* and birefringent elements 36*a* and 36*b* are joined together with any thermosetting transparent silicon resin on the market.

The first and second liquid crystal cells 30a and 30b have the same configuration and each include a pair of substrates and a liquid crystal layer sandwiched between the substrates.

Synchronously with the switching of image frames or sub-frames to be displayed on the display panel 2, the optical shifter 43 periodically shifts the optical axis of the outgoing light of the display panel 2 perpendicularly to the optical axis. By getting the polarization states switched by the liquid crystal cells 36a and 36b appropriately, the image can be selectively shifted to one of three or four locations on the screen, and the apparent number of pixels of the image being presented on the screen can be increased three- or fourfold.

Figure 5:
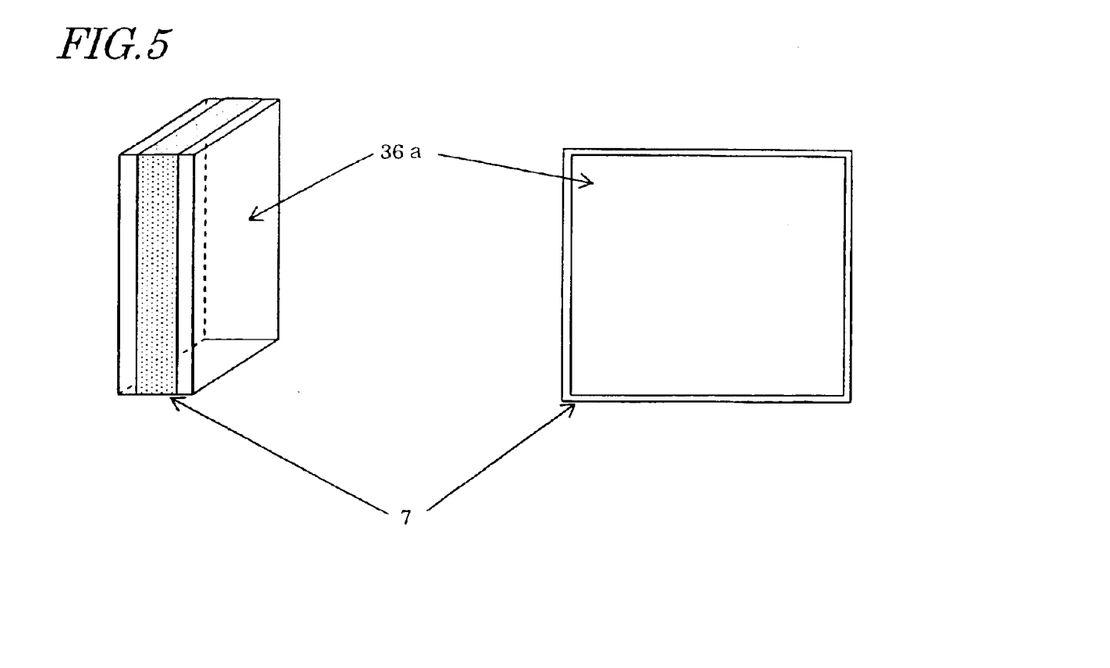
FIG. 5 separately illustrates the optical shifter with the heater for use in the second preferred embodiment.

FIG. 5 separately illustrates the birefringent element 36a included in the optical shifter 43. As shown in FIG. 5, a sheetlike heater 7 is wound around the side surfaces of the birefringent element 36a to heat the birefringent element 36a directly. The birefringent element 36a is interposed between the liquid crystal cells 30a and 30b and is thermally in contact with the principal surfaces of the liquid crystal cells 30a and 30b. Thus, the heat generated from the heater 7 can be conducted to the liquid crystal cells 30a and 30b highly uniformly and efficiently.

Figure 6:
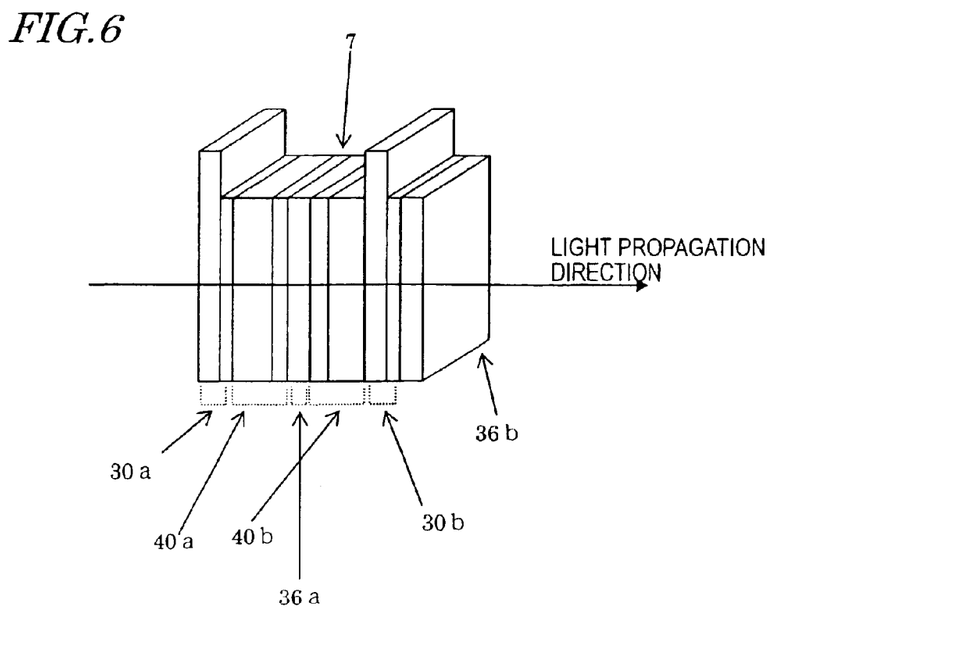
FIG. 6 illustrates another optical shifter that can be used effectively in the second preferred embodiment.

If the birefringent element 36a is too thin (e.g., when the thickness t of the birefringent element 36a is smaller than about 5 mm) to wrap its side surfaces in the heater 7 easily, then the birefringent element 36a may be sandwiched between two transparent blocks 40a and 40b as shown in FIG. 6. The two transparent blocks 40a and 40b may have substantially the same thickness. The transparent block 40a, which is provided on the light outgoing side of the liquid crystal cell 30a, may be joined not only to the second surface of the liquid crystal cell 30a with the resin mentioned above but also to the birefringent element 36a with a similar resin. In the same way, the transparent block 40b, which is provided on the light incoming side of the liquid crystal cell 30b, may be joined not only to the first surface of the liquid crystal cell 30b with the resin mentioned above but also to the birefringent element 36a with a similar resin.

By adopting such an arrangement, the heat can be transferred to the two liquid crystal cells 30a and 30b at approximately equal rates. In this case, the transparent blocks 40a and 40b are also preferably made of a material having a high thermal conductivity such as quartz or sapphire.

In the arrangement shown in FIG. 5 or 6, when the birefringent element 36a, sandwiched between the two liquid crystal cells 30a and 30b, is heated, the two liquid crystal cells 30a and 30b can also be heated uniformly. Thus, the temperatures of the two liquid crystal cells 30a and 30b can be controlled uniformly. As a result, the response speeds of the two liquid crystal cells 30a and 30b can be equalized with each other and the resultant display quality can be stabilized.

Embodiment 3

Hereinafter, an optical display system according to a third specific preferred embodiment of the present invention will be described with reference to FIGS. 7 and 8.

Unlike the optical display system of the first or second preferred embodiment described above, the optical display system of this preferred embodiment includes a supporting member 50 for use to fix the optical shifter 43 in its predetermined position inside the optical display system. This supporting member 50 may either include a heater or function as a heater by itself.

As in the second preferred embodiment described above, the optical shifter 43 of this third preferred embodiment also includes two pairs of liquid crystal cells and birefringent elements. As shown in FIG. 7, the supporting member 50 is provided so as to support the lower half of the birefringent element 36a that is sandwiched between the two liquid crystal cells. In this manner, the optical shifter 43 is fixed to the housing (not shown) of the optical display system. FIG. 8 separately illustrates the birefringent element 36a and supporting member 50 of the optical shifter 43 shown in FIG. 7.

By using the supporting member 50 that can also function as a heater by itself, the number of necessary components can be reduced and the manufacturing cost thereof can also be cut down.

Figure 7:
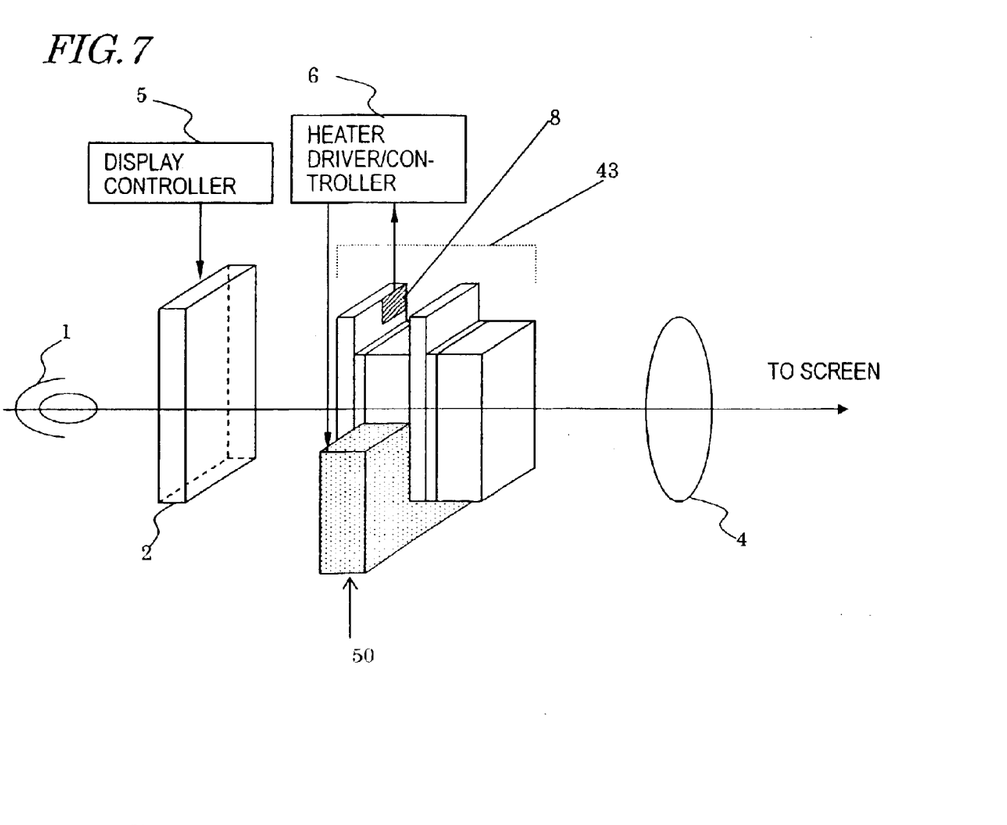
FIG. 7 illustrates an optical display system according to a third specific preferred embodiment of the present invention.
Figure 8:
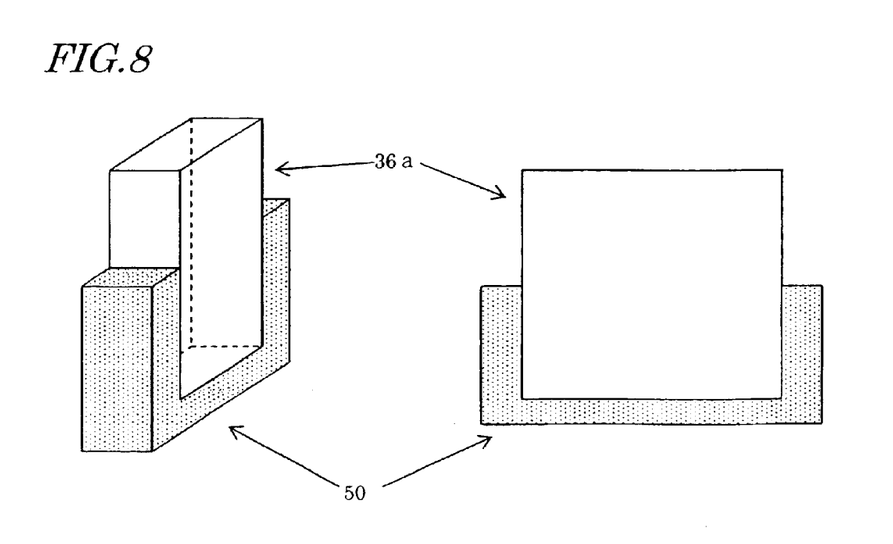
FIG. 8 separately illustrates the optical shifter with the supporting member for use in the third preferred embodiment.

The configuration of the supporting member 50 is not limited to the one illustrated in FIGS. 7 and 8. Alternatively, the supporting member 50 may also be designed to support not only the birefringent element 36a but also the liquid crystal cells 30a and 30b as well.

Embodiment 4

Hereinafter, an optical display system according to a fourth specific preferred embodiment of the present invention will be described.

The optical shifter 3 or 43 of the first through third preferred embodiments described above is heated not only by the heater 7 but also by the incoming light that has been transmitted through the display panel 2. That is to say, the optical shifter 3 or 43 is also subjected to radiation heating. Accordingly, even if the same quantity of heat is constantly transferred from the heater 7 to the liquid crystal cell(s) by way of the birefringent element, the overall quantity of heat reaching the liquid crystal cell(s) actually changes incessantly because the intensity of the light entering the optical shifter changes with time depending on the contents of the image to be displayed. Such a variation in the quantity of heat reaching the liquid crystal cell(s) possibly causes an error in the temperature control process. In a projection type optical display system, in particular, intense light that has been emitted from a high-power light source normally enters the optical shifter. Thus, the temperature of the liquid crystal cell(s) may rise significantly due to the radiated heat and the temperature control process being performed with the heater 7 might be inappropriate. That is to say, the simple feedback control to be performed just by measuring the temperature of the liquid crystal cell(s) with the sensor 8 shown in FIG. 1 could not catch up with the actual dynamic change in temperature quickly enough to maintain the temperature of the liquid crystal cell(s) within the appropriate range.

To overcome this problem, the heater control process is compensated for in this preferred embodiment by the quantity of light entering the optical shifter. The quantity of light reaching the optical shifter may be estimated by a signal representing the average level of the image signal to be displayed, for example. If the image signal is written on a frame memory, the average level of the image signal may be obtained as a sum of the signal levels of respective frames or particular portions of the respective frames. Alternatively, a signal obtained by sequentially integrating the image signal with a low pass filter, for example, may also be used.

For example, suppose an image signal representing a bright image has an increased average level. In that case, the amount of current to be supplied to the heater may be decreased or the ON-state period of the heater may be shortened according to the average level of the image signal. More specifically, the display controller 5 for generating the signal representing the average level of the image signal is used to supply that signal to the heater driver/controller 6 as shown in FIG. 4. In response to that signal, the heater driver/controller 6 controls the quantity of heat to be generated by the heater 7 based on the temperature of the liquid crystal cell(s) that has been detected by the temperature sensor 8 and the average level of the image signal.

The method of minimizing the error of the temperature control process according to this preferred embodiment is applicable for use in any of various optical display systems including the optical shifter of the present invention.

In the preferred embodiments described above, the present invention has been described as being applied to a single-panel projection type optical display system. However, the present invention is applicable for use not just in the single-panel optical display systems but also in three-panel projection type optical display systems and direct-viewing optical display systems.

Also, the optical display system of the present invention is not limited to the projection type but may also be a direct viewing type such as a head mounted display.

According to various preferred embodiments of the present invention described above, the temperature(s) on the light incoming surface and/or light outgoing surface of a liquid crystal cell are/is controlled by way of a heat transfer member (such as a birefringent element or a transparent block) included in an optical shifter for use to achieve image wobbling. Thus, the liquid crystal cell can be heated uniformly and the response characteristic of liquid crystal molecules can have a highly uniform two-dimensional distribution. As a result, the deterioration in image quality, which would otherwise be caused by a two-dimensional variation of the response characteristic, can be minimized. Also, in an embodiment in which the optical shifter includes two liquid crystal cells, these two liquid crystal cells can be heated simultaneously and the temperature distributions of the liquid crystal cells can be uniformized easily.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical shifter comprising:
    at least one liquid crystal cell, which has a first surface to receive light thereon and a second surface to pass the light therethrough and which selectively changes polarization states of the light according to a voltage applied thereto; and
    a birefringent element, which receives the light that has gone out of the liquid crystal cell through the second surface thereof and which selectively shifts the optical path of the light depending on the polarization state of the light,
    wherein the optical shifter controls the temperature of the liquid crystal cell by way of at least one heat transfer member, through which heat is transferable to/from the first surface and/or the second surface of the liquid crystal cell.

2. The optical shifter of claim 1, wherein the birefringent element also functions as the heat transfer member.

3. The optical shifter of claim 2, wherein the birefringent element is in contact with the second surface of the liquid crystal cell either directly or by way of a layer of a material that has a higher thermal conductivity than the air.

4. The optical shifter of claim 1, wherein the heat transfer member includes a transparent block that is disposed beside the first surface of the liquid crystal cell.

5. The optical shifter of claim 4, wherein the transparent block is in contact with the first surface of the liquid crystal cell either directly or by way of a layer of a material that has a higher thermal conductivity than the air.

6. The optical shifter of claim 1, further comprising a heater for heating at least a portion of the heat transfer member.

7. The optical shifter of claim 6, wherein the heater is in contact with a side surface of the heat transfer member either directly or by way of a layer of a material that has a higher thermal conductivity than the air.

8. The optical shifter of claim 7, wherein the heater is in contact with only the side surface of the heat transfer member.

9. The optical shifter of claim 6, wherein the quantity of heat to be generated by the heater is adjusted according to an average level of an image signal representing an image to be shifted.

10. An optical shifter comprising:
    a plurality of liquid crystal cells including at least a first liquid crystal cell and a second liquid crystal cell, each of the first and second liquid crystal cells having a first surface to receive light thereon and a second surface to pass the light therethrough and selectively changing polarization states of the light with a voltage applied thereto;
    a first birefringent element, which receives the light that has gone out of the first liquid crystal cell through the second surface thereof and which selectively shifts the optical path of the light depending on the polarization state of the light; and
    a second birefringent element, which receives the light that has gone out of the second liquid crystal cell through the second surface thereof and which selectively shifts the optical path of the light depending on the polarization state of the light,
    wherein the optical shifter controls the temperatures of the first and second liquid crystal cells by way of at least one heat transfer member, through which heat is transferable to/from the second surface of the first liquid crystal cell and the first surface of the second liquid crystal cell.

11. The optical shifter of claim 10, wherein the first birefringent element also functions as the heat transfer member.

12. The optical shifter of claim 10, wherein the heat transfer member includes at least one transparent block that is provided between the first birefringent element and the first and/or second liquid crystal cell(s).

13. The optical shifter of claim 12, wherein the heat transfer member includes: a first transparent block that is provided between the first liquid crystal cell and the first birefringent element; a second transparent block that is provided between the second liquid crystal cell and the first birefringent element; and the first birefringent element.

14. The optical shifter of claim 13, wherein the first and second transparent blocks are each in contact with the first birefringent element either directly or by way of a layer of a material that has a higher thermal conductivity than the air.

15. The optical shifter of claim 10, further comprising a heater for heating at least a portion of the heat transfer member.

16. The optical shifter of claim 15, wherein the heater is in contact with a side surface of the heat transfer member either directly or by way of a layer of a material that has a higher thermal conductivity than the air.

17. The optical shifter of claim 15, wherein the heater is in contact with a side surface of the first birefringent element either directly or by way of a layer of a material that has a higher thermal conductivity than the air.

18. The optical shifter of claim 15, wherein the heater is in contact with side surfaces of the first and second transparent blocks either directly or by way of a layer of a material that has a higher thermal conductivity than the air.

19. The optical shifter of claim 15, wherein the quantity of heat to be generated by the heater is adjusted according to an average level of an image signal representing an image to be shifted.

20. The optical shifter of claim 4 or 12, wherein the thermal conductivity of the transparent block(s) is higher than that of the liquid crystal cell(s).

21. The optical shifter of claim 4 or 12, wherein the heat transfer member has the function of supporting the birefringent element and/or the transparent block(s).

22. An optical display system comprising the optical shifter of claim 1 or 12.

23. An optical display system comprising:

a display panel having a display plane on which multiple pixels are arranged in a regular pattern;

a display controller for supplying an image signal, representing an image to be presented on the display plane, to the display panel; and the optical shifter of claim 1 or 10, wherein synchronously with switching of the images presented on the display plane, the optical shifter periodically shifts the optical axis of a light ray, which has gone out of the display plane, perpendicularly to the optical axis.

* * * * *